United States Patent [19]

Cook, Jr.

[11] 4,355,299

[45] Oct. 19, 1982

[54] DUAL WHEEL, TIRE PRESSURE TESTER

[75] Inventor: Willard G. Cook, Jr., West Simsbury, Conn.

[73] Assignee: United Technologies Corporation, Hartford, Conn.

[21] Appl. No.: 277,536

[22] Filed: Jun. 26, 1981

[51] Int. Cl.³ .............................................. B60C 23/00
[52] U.S. Cl. ..................................... 340/58; 73/146.2
[58] Field of Search ............ 340/58; 200/61.22, 61.23; 73/146, 146.2, 146.3, 146.5

[56] References Cited

U.S. PATENT DOCUMENTS

| 3,740,710 | 6/1973 | Weintraub et al. | 73/146 |
| 3,973,436 | 8/1976 | Lenderman | 73/146.2 |
| 4,084,431 | 4/1978 | Newby | 73/146.2 |

Primary Examiner—Alvin H. Waring
Attorney, Agent, or Firm—Dominic J. Chiantera

[57] ABSTRACT

A plurality of fluid filled hoses sealed at one end are arranged in parallel in the wheel path and direction of travel of the vehicle, the hoses relatively spaced at a distance dependent on the tire tread width to ensure contact by each tire's footprint with at least two hoses, each hose is connected at the opposite end to an associated pressure transducer which provides sensed signal information of the actual fluid pressure in the hose at all times, whereby the sensed hose pressure signal information, in response to the applied vehicle load on the hoses provides a tire inflation pattern for the vehicle which may be compared with a reference pattern for normal inflation to determine adequate tire pressure.

12 Claims, 7 Drawing Figures

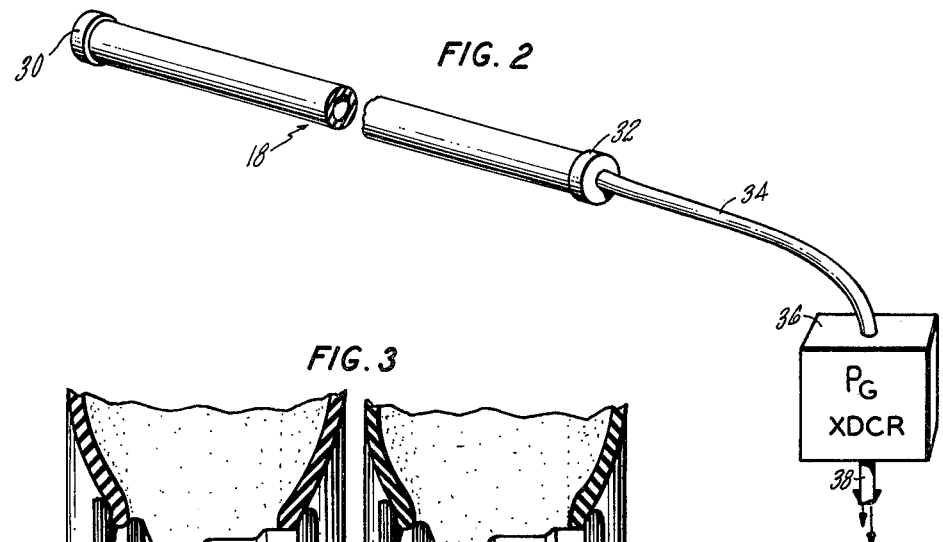
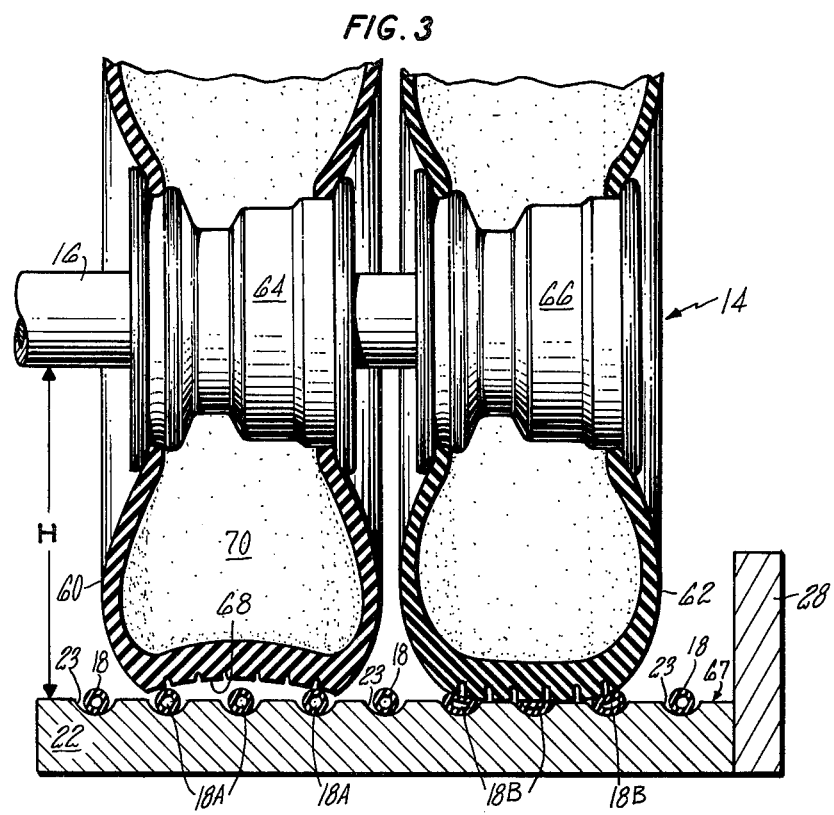
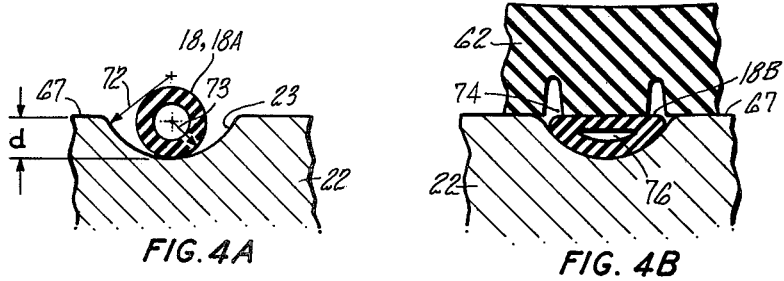

DUAL WHEEL, TIRE PRESSURE TESTER

The invention described herein was made in the course of, or under a grant from the U.S. Department of Transportation.

TECHNICAL FIELD

This invention relates to automatic testing of vehicle tire pressures, and more particularly to testing tire pressure on vehicles having more than two wheels per axle.

BACKGROUND ART

Large sized motor vehicle with high weight capacities, e.g. buses and tractor-trailers include multiple pairs of wheels on the vehicle's rear axle(s). This is required to support and uniformly distribute the vehicle weight on the road surface. Commonly referred to as "dual wheel" vehicles (actually dual wheel pairs) they include vehicles with at least one rear axle having at least one pair of wheels on either end of the axle.

A known characteristic of dual wheel vehicles is that underinflated or deflated tires within a wheel pair do not give a visual appearance of being flat since the remaining inflated tires on the axle fully support the vehicle weight. As a result, the vehicle axle is maintained at the same distance above the roadway surface by the remaining inflated tires. The underinflated tire does not carry any of the load and, therefore, does not sag or crush to the pavement. Flat tires are simply not visible as they are on single wheel axles, resulting in ultimate tire failure on the highway.

Absent the ability to visually detect underinflated tires, the obvious solution is to frequently measure actual tire pressure. However, as known to dual wheel vehicle operators and maintenance personnel, there is no easy way to quickly and accurately measure the tire pressure of the inboard wheel of a dual wheel pair, i.e. the tire mounted on the wheel closest to the vehicle chassis. Although measurement of the inboard tire pressure is possible with effort, it is difficult enough to discourage frequent measurement. The result is that most often actual tire pressure measurement is made only during scheduled maintenance of the vehicle. An alternate, but less quantitative method used by vehicle operators includes striking the tire with some type of club or iron, and judging by the feel and sound whether or not the tire is inflated. This method is accurate only for gross failures, i.e. flat tires, since it depends on the experience and judgment of the person performing the test. An underinflated tire may feel inflated, but may still be sufficiently smaller in diameter than the mating tire so as to scuff along the roadway surface. This scuffing abrades the tire resulting in heat build-up and tire blow out or fire. All of which could be avoided by frequent tire pressure measurement.

DISCLOSURE OF INVENTION

The object of the present invention is to provide method and apparatus for automatically testing tire pressure of dual wheel vehicles.

According to the present invention, a plurality of fluid filled hoses sealed at one end are arranged in parallel in the wheel path and direction of travel of the vehicle, the hoses relatively spaced at a distance dependent on the tire tread width to ensure contact by each tire's footprint with at least two hoses, each hose is connected at the opposite end to an associated pressure transducer which provides sensed signal information of the actual fluid pressure in the hose at all times, whereby the sensed hose pressure signal information, in response to the applied vehicle load on the hoses, provides a tire inflation pattern for the vehicle which may be compared with a reference pattern for normal inflation to determine adequate tire pressure. In further accord with the present invention, the hoses are arranged in hose fixtures, or cradles in each of two groups spaced apart at a distance related to the length of the vehicle axle, with the total number of hoses in each group being sufficient to allow for misalignment in vehicle travel over the hoses. In still further accord with the invention, the hose cradle includes a plurality of longitudinal grooves extending in the direction of vehicle travel, each groove acting as the receptacle for one of the hoses in the cradle, each groove cross section being in the form of an arc with a radius greater than that of the hose to allow cross section expansion of the hose when collapsed under vehicle weight applied through an inflated tire, the depth of the grooves, as measured from the surface area of the cradle in contact with the tires, being selected to allow fluid passage through the hose in the collapsed state, thereby prohibiting pinch-off of the hose and a resulting saturated pressure sensed reading.

The present invention provides automatic testing tire pressure on all dual wheel vehicle types, without manual involvement by an operator. It provides a quantitative pressure test result for dual wheel vehicles and detects underinflated, or deflated tires even though supported by the remaining inflated tires on the axle; a characteristic which masks the existence of an underinflated tire on a dual wheel vehicle by any method other than direct measurement by an operator.

The present tire pressure test may be performed quickly, with the vehicle moving on the roadway section on which the groups of hoses are arranged. The resulting sense tire pressure pattern may be stored in a signal processor for comparison with a reference pattern established for the vehicle, or may be read directly by an operator on a suitable display, whichever is deemed more practical. The pressure sensing devices may be pressure transducers which provide analog measurement of the actual tire pressure, or pressure switches which establish a pressure threshold to permit a discrete go/no-go test.

These and other objects features and advantages of the present invention will become more apparent in light of the following detailed description of a best mode embodiment thereof, as illustrated in the accompanying Drawing.

BRIEF DESCRIPTION OF DRAWING

FIG. 2 is a perspective illustration of one element of the embodiment of FIG. 1;

FIG. 3 is a cross section of a dual wheel pair, as used in the description of the system of FIG. 1;

FIGS. 4A and 4B are cross section illustrations of one of the elements of FIG. 3, as used in the description of the system of FIG. 1.

BEST MODE FOR CARRYING OUT THE INVENTION

Figure 1:
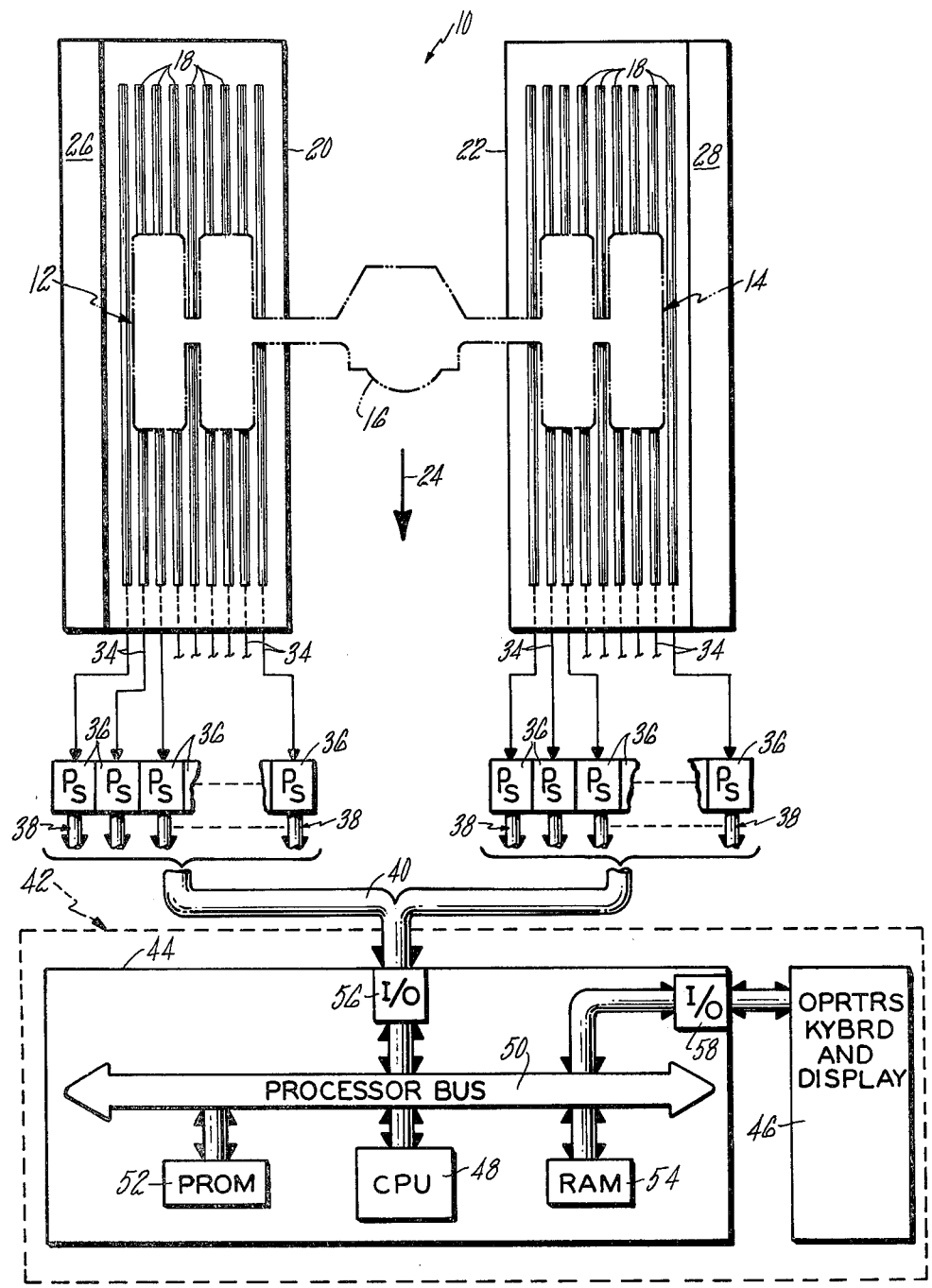
FIG. 1 is a simplified system block diagram of a best mode embodiment of the dual wheel tire pressure tester of the present invention.

FIG. 1 illustrates the present tire pressure measurement system 10 for automatically testing tire pressure in each of two dual wheel pairs 12, 14 mounted on a common axle 16. A plurality of pressure sensing elements, in the form of fluid filled hoses 18 are disposed in two hose cradles 20, 22 located beneath the dual wheel pairs on opposite sides of the vehicle. The hoses are located in longitudinal grooves (23, FIG. 3) formed in each cradle, which maintain alignment of the hoses parallel to the direction of vehicle travel, as indicated by the arrow 24. The actual number of hoses in each cradle group is selectable based on wheel size, axle length, and allowance for vehicle misalignment on the array.

The hoses are relatively spaced at equal distances, at a value dependent on the range of tread widths for the tires to be tested. In certain applications, such as for use with fleet vehicles of the same type, e.g. buses, trucks, the tire sizes are relatively fixed. In either case the distance is selected to ensure that each tire comes in contact with at least two, and preferably three hoses as the vehicle is driven across, i.e. placed on the hose array. Similarly, the length of the hoses, and support cradles are selectable, with typical hose length on the order of two feet.

Ideally the groups of hoses 20, 22 are placed in a section of driveway (roadway) of a vehicle facility, such as a garage, over which the vehicles must pass. This may be a common entranceway into the garage. To ensure registration of vehicle tires with the hoses in each group, curbs 26, 28, or some type of guide rails may be placed on the output perimeter of each of the two cradles to guide the vehicle when traveling across the section of driveway.

FIG. 2 illustrates, in perspective, the typical construction of the hose sensors. The hoses are each filled with a relatively incompressible fluid, such as hydraulic fluid, and each are made from a flexible material of the type used for low pressure hydraulic lines, e.g. up to 250 PSIG. Typical wall thickness of the low pressure hoses is 0.125 inches (0.328 cm). One end of each of the hoses is sealed by an end cap 30 suitably connected to the hose end by known pressure fit or bonding methods, to prevent fluid leakage from the hose under the maximum line pressure conditions. The other end of each hose is connected through pressure fitting 32 to a standard instrumentation line 34, each of a type known in the art. The instrumentation line is connected in turn to a pressure transducing device 36, such as a pressure sensor which provides an electrical analog signal equivalent of the actual gauge pressure (PSIG) of the hydraulic fluid in the hose, or a pressure switch which provides a simple bi-stable discrete signal indicative of the actual pressure being above or below a set pressure switch threshold. The use of a linear type pressure sensor permits quantitative measurement of the actual hose pressure which may be correlated to tire pressure. Alternatively, the pressure switch provides a less qualitative measurement of tire pressure, but does provide a simple, quick determination of minimum tire pressure. In either case the electrical signal equivalent from the transducer is provided on output lines 38.

In FIG. 1 the hoses are schematically shown connected through instrumentation lines 34 to the pressure transducers 36, which are labeled $P_S$ to indicate pressure sensing devices. The transduced electrical signal output from the pressure sensing devices on lines 38 are presented through trunk lines 40 to an operator's console 42 which may include alternate embodiments, depending on the degree of testing performed. In FIG. 1 the console is illustrated as including a signal processor 44 and keyboard display unit 46. The signal processor functions as the data acquisition unit for the system; processing the sensed pressure signals and comparing the resulting sensed pressure signal tire patterns with reference patterns which define nominal tire pressure pattern for the particular type of vehicle(s) under test. The processor architecture is that known in the art, and includes a central processing unit (CPU) 48, typically a microprocessor, connected through input/output (I/O) lines to a data bus 50 which interfaces the CPU with: a programmable read-only memory (PROM) 52 which stores the processor program listing, a random access memory (RAM) 54 for storing the sensed data, and I/O interfaces 56, 58 for the sensed pressure signals on lines 40 and the display unit 46. The CPU may be any known type proprietary, general purpose microprocessor, such as an INTEL 8085 which is used in combination with known memory modules, peripheral display units, and I/O interface modules. The particular type CPU is dependent on the application requirements of the particular tire pressure testing system, e.g. the number of different dual wheel vehicle types to be tested. As such the processor itself forms no part of the present invention, and may be any type selected by those skilled in the art based on system through-put and storage requirements. Similarly, the software package used with the particular type CPU selected may include any one of a number of software packages which may be known, or readily apparent to those skilled in the programming art.

FIG. 3 illustrates the dual wheel pair 14, with the tires 60, 62 (shown in cross section) mounted on wheels 64, 66 and placed on the hoses 18 in the cradle 22. It is assumed that the inboard tire 60 is deflated, and that mating tire 62 and the tires of wheel pair 12 mounted on the common axle 16 are all inflated to normal pressure. As shown, the deflated tire remains in a non-collapsed state, i.e. there is no tire sag to the surface 67 of the hose cradle since the axle is supported at the normal height (H) above the surface by the remaining inflated tires. The deflated tire has a greater reduced footprint, i.e. surface contact, with the cradle surface. The tire tread surface 68 becomes essentially concave; withdrawing into the interior chamber 70 of the tire and providing little or no surface contact with the hoses 18A beneath the tread surface 68. The surface contact that is provided is essentially that of the tire side walls, such that the fluid pressure within hoses 18A remains essentially at the quiescent level. Conversely the hoses 18B beneath the pressurized tire 62 are fully compressed by the vehicle weight transmitted through the fully expanded tread surface.

FIG. 4 illustrates the extreme conditions between the noncompressed and compressed hoses 18, 18A, 18B. As stated hereinbefore, the hoses 18 are located within associated longitudinal grooves (23, FIG. 3) in each hose cradle. The cross-section of the groove is an arc with a radius of curvature 72 greater than the radius 73 of the hose to allow for cross sectional expansion of the hose in the collapsed state (18B) under the force applied through the pressurized tires of the vehicle. The larger radius of the groove allows the hose to distort freely within the groove without pinching or abrasion of the hose. Similarly, the depth (d) of the groove from the cradle surface 67 is also greater than the hose cross section radius to prevent the hose from completely collapsing and sealing off the internal fluid passage. Since the fluid is essentially noncompressible, sealing off the internal fluid passage results in a saturated line pressure reading by the sensors 36, which could be construed as a sensor failure. As shown in FIG. 4 even under full vehicle weight the hose 18B maintains some cross section fluid passage through the length of the hose in contact with the tire tread.

Since the hose cradles may be placed directly in the roadway or floor of the vehicle facility, tire pressure measurement in each of the dual wheels may be performed quickly, "on the run" as the vehicle is driven across the hose arrays. The only criteria in testing the dual wheel tires is the detection of an underinflated tire in the wheel pair. Since each of the tires in a wheel pair must have substantially equal, i.e. matched diameters to ensure equal circumferential length of travel (avoid scuffing) they are replaced in pairs. Whether due to an underinflated tire or normal uneven wear, replacement of one generally requires replacement of both to maintain the matched diameters. This being the case the tire testing need only indicate the existence of an underinflated tire in a tire pair, it need not specifically identify the particular one.

Figure 5:
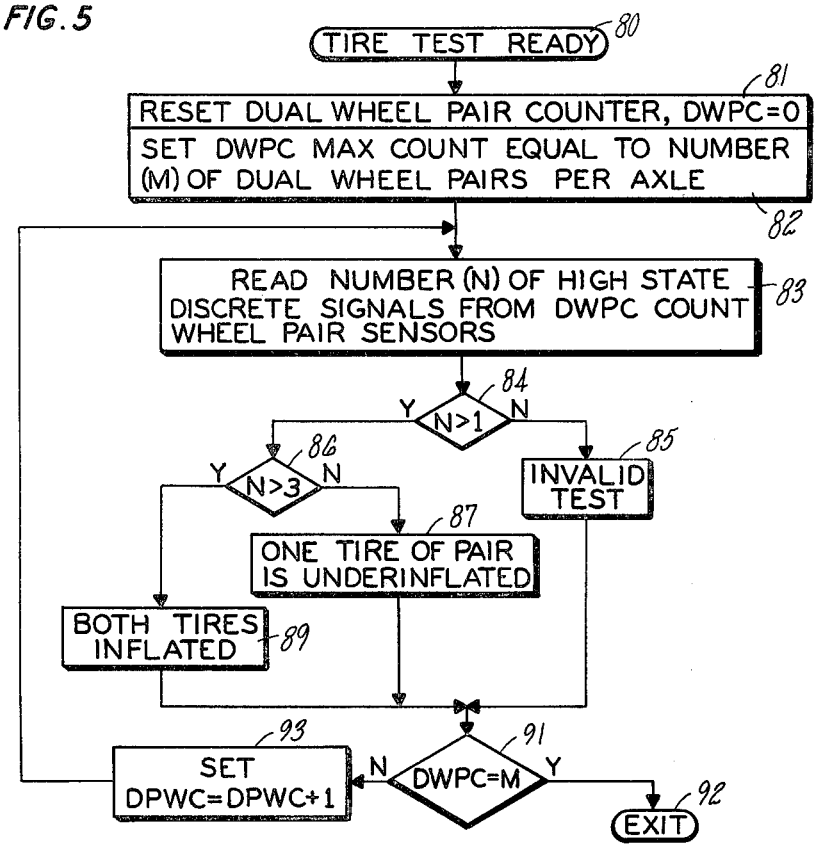
FIG. 5 is a schematic illustration of an alternative element for use in the system of FIG. 1.

For the microprocessor-based system of FIG. 1, the CPU performs the simple subroutine of FIG. 5 in executing the tire test procedure. The CPU enters the subroutine on an interrupt 80, e.g. Tire Test Ready. The interrupt may be provided in response to the presence of some number of high state (logic one) discretes on the pressure transducer outputs associated with each hose group (cradle 20, 22, FIG. 1). The interrupt source must be selective, i.e. distinguish between the vehicles front single wheel axle and the rear dual wheel axles. Since the hoses are relatively spaced to ensure at least two (and preferably three) hoses coming in contact with each tire footprint, the interrupt is provided only in response to the presence of more than three (four) high state pressure sensor discretes from either hose group. Each of the vehicle's front tires can only produce a maximum of three discrete high state signals, so that monitoring each group of hoses for the presence of at least four high state discretes from either group allows accurate detection of the presence of the rear dual wheel pair on the hoses. Following interrupt 80 instructions 81 require the reset of the dual wheel pair counter (DWPC) to zero and instructions 82 set the DWPC max count equal to the number (M) of dual wheel pairs per axle; typically two. For testing of common type fleet vehicles the number M may be fixed.

Instructions 83 next request the CPU to determine the number (N) of high state signal discretes appearing at the pressure sensor outputs of a first group of dual wheel sensors. Where M=2 this corresponds to the left or right hose cradle. Since the test may be performed while the vehicle is driven across the hose sensors the pressure sensor output signals, if necessary, may be momentarily preserved by loading them into interim buffer registers within the CPU to allow delayed readout. Following instructions 83, decision 84 determines if N is greater than one. There must be at least two high state discrete signals to indicate a valid test condition. If the answer is NO instructions 85 request an INVALID TEST indication. If N is greater than on (YES), decision 86 determines if N is greater than three; each inflated tire footprint contacts at least two hoses, for a minimum of four hoses in an inflated dual wheel pair. Therefore, if the answer is NO, instructions 87 require a CPU indication that ONE TIRE OF PAIR IS UNDERINFLATED. If N is greater than three, than instructions 89 request an indication that BOTH TIRES INFLATED. Following instructions 85, 87 or 89 decision 81 determines if DWPC=M i.e. the last wheel pair to be examined. If YES the CPU exits the subroutine at 92. If NO, instructions 93 increment the wheel counter by one, after which the CPU recycles through instructions 83-89 for the next wheel pair sensor outputs.

Figure 6:
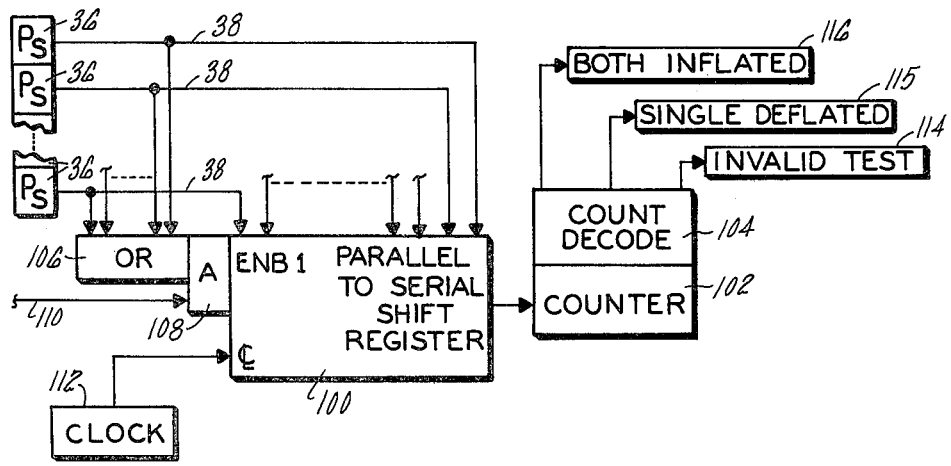
FIG. 6 is a block diagram of the hardware in a system where the hose sensors provide an immediate indication of the tire pressure states.

The test result indications in instruction 85, 87 and 89 may be provided in any of a number of known man-machine formats, e.g. printout, different visual indications such as an alarm or lamp, or a combination of printout plus alarm. Furthermore, since the hose sensors themselves provide an immediate indication of the tire pressure states and the reading of the sensor outputs involves a relatively simple routine, an alternative dedicated hardware configuration may be used instead of a signal processor. In this case circuit hardware for each group of pressure sensors may be used to provide the sensed data analysis. As illustrated in FIG. 6 a typical hardware configuration for each hose group includes a parallel-to-serial shift register 100, a serial counter 102, and count state decode circuitry 104. The shift register 100 receives the parallel discrete signal outputs from the pressure sensors 36 of the associated hose cradle group on lines 38, at the input of the register. An OR gate 106, connected at its input to each of the sensor output lines of the group, provides the indication of the presence of at least one high state discrete to the input of an AND gate 108. A second input of the AND gate is connected to a position sensor output, and the output of the AND gate is connected to the ENABLE input of the register. The position sensor (not shown) is of a known type and provides a discrete indication of the position of the vehicle dual wheels on the cradle hoses. This position signal allows for discrimination between the pressure signal indications provided by the vehicle front tires from those of the rear tires. In the presence of simultaneous high level discretes from the OR gate and position sensor the AND gate provides an enable to the shift register which then strobes in the discrete signal information on the input lines. A time base signal from a clock 112 shifts out the loaded-in data in a serial bit stream from the register to the input of a counter 102. The counter counts each high state discrete and provides the count value at its output to the count decode circuitry 104 which decodes the count value to provide one of four count state test result indications 114-117, corresponding to the CPU indications of instructions 85, 87 and 89. Once again these indications may be discrete lamp indications, an audible alarm, or any other suitable visual indication which provides notice to an operator. The count decode circuitry 104 also resets the counter to zero following completion of the count decode.

The dual wheel tire pressure tester of the present invention provides automatic testing of tire pressures on all types of dual wheel vehicles. It performs the tire tests automatically, without manual assistance from an operator, and may be performed while the vehicle is in motion traveling across the hose sensors within roadway mounted cradles. It allows for detection of an underinflated tire in a dual wheel tire pair notwithstanding the fact that the remaining tires of the common axle group are all inflated.

The actual devices used to convert the pressure sensed signal from the hose sensors into electrical signal equivalents may alternately comprise pressure switches for providing discrete bi-stable outputs signals (inflated or underinflated) or pressure transducers for providing a linear output indicative of relative degrees of tire inflation. The system may also be provided in alternative embodiments, including: a signal processor based system in which a CPU monitors and analyzes the resulting sensed discrete signals from the transducers, or an alternative discrete hardware configuration with individual test result analyzing circuitry dedicated to each of the various hose group (cradles). Similarly, although the invention has been shown and described with respect to a preferred embodiment thereof, it should be understood by those skilled in the art that various other changes, omissions, and additions in the form and detail thereof may be made therein without departing from the spirit and scope of the invention.

I claim:

1. Apparatus for automatically detecting tire pressures of dual wheel vehicles, comprising:
   plurality of fluid filled tire sensors arranged lengthwise in a spaced array parallel to the direction of vehicle travel across a selected section of roadway, the sensors each spaced relative to each other at a distance dependent on the vehicle tire tread width to ensure contact of at least two sensors with each tire footprint as the vehicle is driven along the length of said sensor array, each fluid filled sensor being sealed at one end and having a fluid port at the opposite end thereof, whereby said sensors each provide in response to surface contact thereof with a vehicle tire footprint a fluid pressure increase at said fluid port;
   plurality of pressure sensing devices, one for each of said tire sensors and each connected for response to said fluid port thereof, for providing an output signal indication at a magnitude indicative of the quiescent fluid pressure within said associated sensor; and
   means responsive to said output signal indications from all of said pressure sensing devices for determining, in response to the magnitude of said signal indications the state of tire pressure for each tire of each dual wheel pair.

2. The apparatus of claim 1, wherein said plurality of fluid filled tire sensors each comprise low pressure hydraulic hoses filled with a hydraulic fluid, said hoses having a resilient wall structure capable of compressing at the point of contact thereof with the applied force of a tire footprint and for reforming in response to the removal of the applied force, said hydraulic fluid pressure increasing in magnitude from a quiescent fluid pressure to a higher fluid pressure in direct proportion to the degree of compression of said hose in response to the force applied by the tire footprint, whereby said fluid pressure value at said fluid port of said hose tire sensor provides an indication of the inflation pressure of the tire applying the footprint.

3. The apparatus of claim 2, wherein said hydraulic hoses each limit the pressure increase of the fluid therein to a maximum of 250 PSIG.

4. The apparatus of claim 2, wherein said fluid ports of each of said hose tire sensors comprises a pressure fitting adapted for connection to a standard instrumentation pressure line.

5. The apparatus of claim 2, wherein said plurality of sensor hoses are arrayed in separate groups, each associated with the pairs of dual wheels mounted on opposite ends of the vehicle axle, each group comprising a selected number (N) of hoses therein so as to ensure footprint contact with each dual wheel tire even in the presence of misregistration of the vehicle on the hose array.

6. The apparatus of claim 2, wherein said sensor hoses each have a cross-sectional diameter selected to prevent entrapment of said hoses within the tire tread of the vehicle under test.

7. The apparatus of claim 5, wherein said sensor hoses in each group are arrayed in a hose group cradle, said cradle being adapted to permit vehicle travel across a major surface thereof, said major surface being adapted for receiving each of said hoses in a related one of a like plurality of longitudinal grooves therein for maintaining said hoses in said spaced array parallel to the direction of vehicle travel in said selected section of roadway.

8. The apparatus of claim 7, wherein said longitudinal grooves have a cross-sectional geometry in the form of an arc with a radius of curvature sufficiently greater than the radius of said hose sensor disposed therein to permit free expansion of the hose, without abrasion, during compression thereof in response to the applied force of a tire footprint.

9. The apparatus of claim 8, wherein said grooves have a depth, as measured from said major surface, which is sufficiently greater than said radius of said hose to limit said compression of said hose to a value which still maintains fluid flow therethrough.

10. The apparatus of claim 1, wherein said pressure sensing devices each comprise a pressure switch having a selectable pressure threshold value therein for providing a discrete bi-stable signal indicative, alternately, of said fluid pressure at said tire sensor fluid port being greater than or less than said threshold.

11. The apparatus of claim 1, wherein said pressure sensing devices each comprise a pressure transducer for providing an output signal indication at a magnitude representative of the actual PSIG fluid pressure at said tire sensor fluid port.

12. The apparatus of claim 1, wherein said means responsive to said pressure sensing devices comprises a signal processing means having memory means therein for storing signals including reference signals definitive of the combination of the various state of tire pressures for each tire of each dual wheel pair, said processing means comparing the output signals from said pressure sensing devices indicative of said tire sensor actual fluid pressures with said reference signals to provide a summary signal indication of the actual state of tire pressures for each tire of each dual wheel pair.

* * * * *